(12) United States Patent  (10) Patent No.: US 8,712,620 B2
Jackson  (45) Date of Patent: Apr. 29, 2014

(54) VEHICLES WITH ELECTRIC MOTOR

(71) Applicant: Emmanuel Jackson, Taylors, SC (US)

(72) Inventor: Emmanuel Jackson, Taylors, SC (US)

( * ) Notice: Subject to any disclaimer, the term of this patent is extended or adjusted under 35 U.S.C. 154(b) by 0 days.

(21) Appl. No.: 13/777,015

(22) Filed: Feb. 26, 2013

(65) Prior Publication Data

US 2013/0332014 A1  Dec. 12, 2013

Related U.S. Application Data

(60) Provisional application No. 61/685,751, filed on Mar. 24, 2012.

(51) Int. Cl.
*B60L 11/18* (2006.01)
*B60W 10/08* (2006.01)

(52) U.S. Cl.
CPC ............. *B60W 10/08* (2013.01); *Y02T 10/6217* (2013.01); *Y02T 10/6221* (2013.01); *B60L 11/18* (2013.01)
USPC .......................................................... 701/22

(58) Field of Classification Search
CPC . B60W 10/08; Y02T 10/642; Y02T 10/6217; Y02T 10/6221
USPC .......................................................... 701/22
See application file for complete search history.

(56) References Cited

U.S. PATENT DOCUMENTS

| | | | | |
|---|---|---|---|---|
| 4,335,429 A | * | 6/1982 | Kawakatsu | 701/102 |
| 5,841,201 A | * | 11/1998 | Tabata et al. | 290/40 C |
| 5,929,608 A | * | 7/1999 | Ibaraki et al. | 322/16 |
| 6,164,400 A | * | 12/2000 | Jankovic et al. | 180/65.25 |
| 6,575,870 B2 | * | 6/2003 | Kitano et al. | 477/3 |
| 6,702,052 B1 | * | 3/2004 | Wakashiro et al. | 180/65.25 |
| 6,847,189 B2 | * | 1/2005 | Frank | 320/104 |
| 6,962,224 B2 | * | 11/2005 | Nakanowatari | 180/65.225 |
| 6,962,550 B2 | * | 11/2005 | Kadota | 477/15 |
| 6,965,824 B2 | * | 11/2005 | Ichimoto et al. | 701/113 |
| 7,317,295 B2 | * | 1/2008 | Izumi et al. | 318/801 |
| 7,440,827 B2 | * | 10/2008 | Kawada et al. | 701/22 |
| 7,520,354 B2 | * | 4/2009 | Morrow et al. | 180/65.31 |
| 7,597,164 B2 | * | 10/2009 | Severinsky et al. | 180/65.27 |
| 7,600,595 B2 | * | 10/2009 | Harris | 180/65.31 |
| 7,641,583 B2 | * | 1/2010 | Houle et al. | 477/5 |
| 7,734,401 B2 | * | 6/2010 | Joe et al. | 701/54 |
| 7,825,616 B2 | * | 11/2010 | Clark et al. | 318/139 |
| 8,164,282 B2 | * | 4/2012 | Okamura | 318/139 |
| 8,256,549 B2 | * | 9/2012 | Crain et al. | 180/65.31 |

* cited by examiner

*Primary Examiner* — Thomas Tarcza
*Assistant Examiner* — Alex C Dunn
(74) *Attorney, Agent, or Firm* — J. Bennett Mullinax, LLC

(57) ABSTRACT

An electric vehicle is provided that can include a first generator configured to generate electric power when the electric vehicle is moving at or above a first speed and a second generator configured to generate electric power when the electric vehicle is moving below the first speed or standing at a stop. The electric vehicle can include a main electric motor that is configured to receive electric power from the first generator when the electric vehicle is moving at or above the first speed and from the second generator when the electric vehicle is moving below the first speed. The electric vehicle can also comprise an auxiliary electric motor in communication with the second generator, wherein, activation of the auxiliary electric motor causes the second generator to generate electric power. The electric vehicle can further comprise one or more batteries configured to supply electric power to the auxiliary electric motor.

20 Claims, 9 Drawing Sheets

VEHICLES WITH ELECTRIC MOTOR

RELATED APPLICATION

The presently disclosed subject matter claims the benefit of U.S. Provisional Patent application Ser. No. 61/685,751, filed Mar. 24, 2012, the disclosure of which is incorporated herein by reference in its entirety.

TECHNICAL FIELD

The present invention relates generally to a vehicle with an electric motor. More particularly, the present application involves a vehicle that includes a low speed generator and a high speed generator that emit current that may be used to operate an electric motor of the vehicle.

BACKGROUND

Vehicles, such as automobiles, are known to employ electric motors for their operation. Electrically powered vehicles emit less greenhouse gases and fewer air pollutants, such as carbon monoxide, than vehicles powered by conventional internal combustion engines. Further, electric vehicles are not dependent upon liquid fuel thus insulating the owner from high oil prices. Although capable of providing vehicles with sufficient power to operate, electric propulsion systems require an energy storage device, usually a battery, to function. The batteries in electric vehicles can be recharged by the user at his or her home, or may be recharged at charging stations located at the user's place of work or at other locations such as service stations. Batteries can be expensive to purchase and may cause the range of the electric vehicle to be limited due to the fact that once the battery has been depleted, the vehicle may have no other source of power from which to run.

Electric vehicles may be provided with certain features to increase their range and decrease the cost of recharging the batteries. For example, regenerative braking can be used to automatically recharge the batteries so that the user does not have to pay for this power or perform any steps necessary for this recharging. Conventional internal combustion engine vehicles have brakes that include brake linings that absorb the kinetic energy of the vehicle and become hot when the brakes of the vehicle are applied. This heat is not collected and instead becomes wasted energy. Regenerative braking can be used to recharge the batteries of the electric vehicle by capturing and converting the kinetic energy of the vehicle. Although mechanisms are used in electric vehicles to recharge the batteries, and to increase range and performance, there remains room for variation and improvement within the art.

SUMMARY

In accordance with this disclosure, the present subject matter provides an electric vehicle that can comprise multiple generators in operable communication with an electric motor that can propel the vehicle in a forward or backward direction. For example, the multiple generators can generate electric power through power supplied by one or more batteries as well as through the weight of the vehicle and the motion of one or more wheels or axles or shafts directly or indirectly connected to the wheels on the electric vehicle. The electric power that is generated by the multiple generators can extend the range of travel of the vehicle before any needed externally recharging of the batteries connected to electric motor.

For example, one aspect of the present subject matter can include an electric vehicle that can comprise a first generator configured to generate electric power when the electric vehicle is moving at or above a first speed and a second generator configured to generate electric power when the electric vehicle is moving below the first speed. The electric vehicle can comprise a main electric motor that is configured to receive electric power from the first generator when the electric vehicle is moving at or above the first speed and from the second generator when the electric vehicle is moving below the first speed. The electric vehicle can also comprise an auxiliary electric motor in communication with the second generator, wherein activation of the auxiliary electric motor causes the second generator to generate electric power. The electric vehicle can further comprise one or more batteries configured to supply electric power to the auxiliary electric motor.

Another aspect of the present subject matter can include an electric vehicle that can comprise a first generator and a second generator. The first generator can generate direct current (hereinafter "DC") when the electric vehicle has achieved a certain speed. The second generator can generate DC when the electric vehicle is at a range of speeds lower than those causing activation of the first generator. The generated DC is converted into alternating current (hereinafter "AC") by a DC to AC converter, sometimes called an inverter, and AC is supplied to an electric motor, various components of the electric vehicle, and to one or more batteries.

In another aspect of the present subject matter, an electric vehicle is provided that can comprise a first generator that generates DC output when the electric vehicle is moving at or above a first speed. The electric vehicle can also comprise a second generator that generates DC output when the electric vehicle is not moving at the first speed or at a speed greater than the first speed. The electric vehicle can also comprise an auxiliary electric motor and one or more batteries that supply DC to the first electric motor. The auxiliary electric motor can be in operable communication with the second generator such that activation of the auxiliary electric motor causes the second generator to generate DC. Additionally, the electric vehicle can comprise a DC to AC converter that receives DC from at least one the first generator or the second generator and generates AC. The electric vehicle can further comprise a main drive electric motor that receives AC from the DC to AC converter.

In further aspect of the present subject matter, an electric vehicle is provided that can comprise a first generator configured to generate AC when the electric vehicle is moving at or above a first speed and a second generator configured to generate AC when the electric vehicle is moving below the first speed. The electric vehicle can comprise a main electric motor configured to receive AC from the first generator when the electric vehicle is moving at or above the first speed and from the second generator when the electric vehicle is moving below the first speed. The electric vehicle can also comprise an auxiliary electric motor in communication with the second generator, wherein activation of the auxiliary electric motor causes the second generator to generate AC. One or more batteries can be provided that are configured to supply DC to the auxiliary electric motor to power the auxiliary motor.

Some, of the objects of the subject matter disclosed herein having been stated hereinabove, and which are achieved in whole or in part by the presently disclosed subject matter, other objects will become evident as the description proceeds when taken in connection with the accompanying drawings as best described hereinbelow.

BRIEF DESCRIPTION OF THE DRAWINGS

The features and advantages of the present subject matter will be more readily understood from the following detailed description which should be read in conjunction with the accompanying drawings that are given merely by way of explanatory and non-limiting example, and in which.

Figure 1:
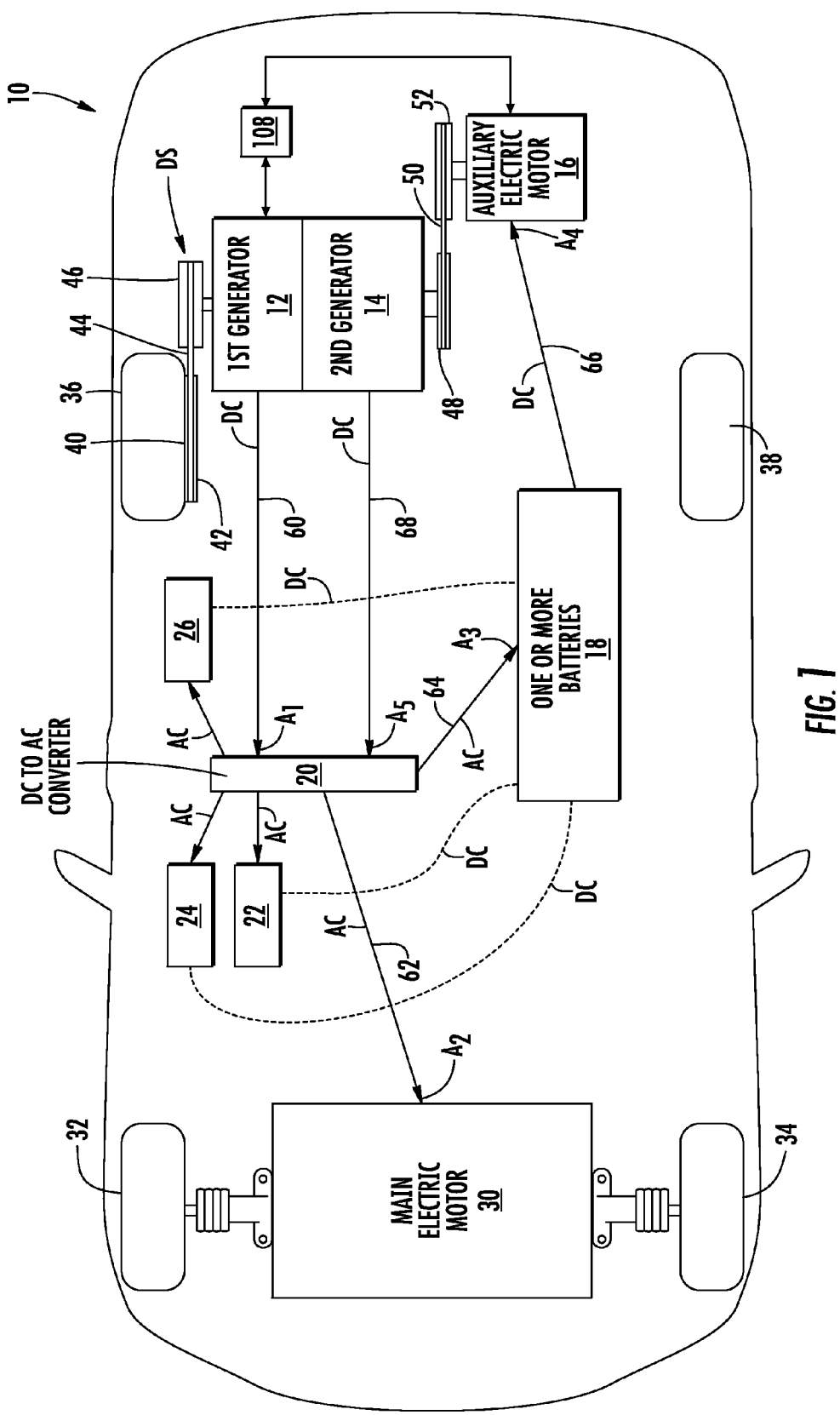
FIG. 1 is a schematic view of an embodiment of an electric vehicle in accordance with the present subject matter.

Repeat use of reference characters in the present specification and drawings is intended to represent the same or analogous features or elements of the invention.

DETAILED DESCRIPTION

Reference will now be made in detail to possible aspects or embodiments of the subject matter herein, one or more examples of which are shown in the figures. Each example is provided to explain the subject matter and not as a limitation. In fact, features illustrated or described as part of one embodiment can be used in another embodiment to yield still a further embodiment. It is intended that the subject, matter disclosed and envisioned herein covers such modifications and variations.

Although the terms first, second, etc. may be used herein to describe various features, elements, components, regions, layers and/or sections, these features, elements, components, regions, layers and/or sections should not be limited by these terms. These terms are only used to distinguish one feature, element, component, region, layer or section from another feature, element, component, region, layer or section. Thus, a first feature, element, component, region, layer or section discussed below could be termed a second feature, element, component, region, layer or section without departing from the teachings of the disclosure herein.

Embodiments of the subject matter of the disclosure are described herein with reference to schematic illustrations of embodiments that may be idealized. As such, variations from the shapes and/or positions of features, elements or components within the illustrations as a result of, for example but not limited to, user preferences, manufacturing techniques and/or tolerances are expected. Shapes, sizes and/or positions of features, elements or components illustrated in the figures may also be magnified, minimized, exaggerated, shifted or simplified to facilitate explanation of the subject matter disclosed herein. Thus, the features, elements or components illustrated in the figures are schematic in nature and their shapes and/or positions are not intended to illustrate the precise configuration of a system or apparatus and are not intended to limit the scope of the subject matter disclosed herein.

Further, it is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

The disclosure herein relates generally to an electric vehicle and powertrains that can be used in electric vehicles that can comprise multiple generators in operable communication with an electric motor that can propel the vehicle in a forward or backward direction. For example, the multiple generators can generate electric power through power supplied by one or more batteries as well as through the weight of the vehicle and the motion of one or more wheels or axles or shafts directly or indirectly connected to the wheels on the electric vehicle. The electric power that is generated by the multiple generators can extend the range of the vehicle. The electric vehicle can be a vehicle that is converted from a conventional vehicle that originally had an internal combustion engine driven powertrain that has been replaced with an electric motor powertrain as disclosed hereinbelow. Alternatively, the electric vehicle can be a new vehicle that originally comprises an electric motor powertrain as disclosed hereinbelow.

For example, in some embodiments, an electric vehicle can be provided that can comprise a first generator configured to generate electric power when the electric vehicle is moving at or above the first speed and a second generator configured to generate electric power when the electric vehicle is moving below the first speed. The electric vehicle can also comprise a main electric motor configured to receive electric power from the first generator when the electric vehicle is moving at or above a first speed and from the second generator when the electric vehicle is moving below the first speed. Further, the electric vehicle can comprise an auxiliary electric motor in communication with the second generator, wherein activation of the auxiliary electric motor causes the second generator to generate electric power. One or more batteries can be configured to supply electric power to the auxiliary electric motor. In some such embodiments, the first generator and the second generator can generate DC and the electric vehicle can further comprise a DC to AC converter that is electrically connected to the first generator and the second generator to convert DC supplied by the first generator or the second generator to AC with the DC to AC converter supplying AC to the main electric motor and the batteries. In some other such embodiments, the first generator and the second generator generate AC that is supplied directly to the main motor.

For example, in some embodiments, an electric vehicle can comprise a first generator that can generate DC when the electric vehicle is moving at or above a first speed and a second generator that can generate DC when the electric vehicle is moving below the first speed. The electric vehicle can also comprise an auxiliary electric motor in communication with the second generator so that activation of the electric motor can cause the second generator to generate DC and batteries that supply DC to the auxiliary electric motor. Further, the electric vehicle can comprise a DC to AC converter that supplies AC to the batteries and to a component of the electric vehicle and a main electric motor that receives AC from the DC to AC converter.

In some embodiments, an electric vehicle can comprise a first generator that generates AC when the electric vehicle is moving at or above the first speed and a second generator that generates AC when the electric vehicle is moving below the first speed. The electric vehicle can also comprise a main electric motor that receives AC from the first generator when the electric vehicle is moving at or above the first speed and from the second generator when the electric vehicle is moving below the first speed. Further, the electric vehicle can comprise an auxiliary electric motor in communication with the second generator so that activation of the auxiliary electric motor causes the second generator to generate AC and one or more batteries that supply DC to the auxiliary electric motor to power the auxiliary motor.

In some of the embodiments outlined above, a controller, such as a microprocessor, can be used to obtain speed data from the electric vehicle and activate the auxiliary motor to cause the second generator to generate electric power when the electric vehicle is moving below the first speed and activate the first generator when the electric vehicle is moving at or above the first speed. The controller can deactivate the auxiliary motor when the electric vehicle is moving at or above the first speed. Further, in some embodiments, the controller can deactivate the first generator when the electric vehicle is moving below the first speed.

The electric vehicle can further comprise a generator drive system. In some embodiments, the generator drive system can engage a rim of a wheel of the electric vehicle and the first generator so that the drive system drives the first generator as the rim rotates with the wheel. For example, the generator drive system can comprise a pulley attached to a rim of a wheel of the electric vehicle that is used to drive the first generator. In some such embodiments, the generator drive system can comprise a pulley attached to a rim of a wheel of the electric vehicle, a pulley attached to a shaft of the first generator, and a belt that rotatably engages the pulley attached to the rim of the wheel and the pulley attached to a shaft of the first generator to drive the first generator.

In other examples, the generator drive system can comprise a sprocket attached to a rim of a wheel of the electric vehicle that is used to drive the first generator. In some embodiments, the generator drive system can comprise a transmission gear attached to a shaft of the first generator and a chain that rotatably engages the sprocket attached to a rim of a wheel of the electric vehicle and the transmission gear attached to a shaft of the first generator to drive the first generator. In some embodiments, the generator drive system can comprise a drive train with a transmission gear attached to a shaft of the first generator and one or more other transmission gears positioned between the sprocket and the transmission gear attached to a shaft of the first generator.

In some embodiments, the electric vehicle can comprise a generator drive system that engages a transmission shaft of the electric vehicle and the first generator so that the drive system drives the first generator as the transmission shaft rotates.

In some embodiments, a clutch can be disposed between the generator drive system and the first generator and a clutch can be disposed between the auxiliary motor and the second generator. These clutches can be used respectively to both transfer and stop the rotation of the first generator and the second generator.

Further embodiments of the electric vehicles disclosed herein can be described in more detail with reference to the figures. For example, as shown in the FIG. 1, an electric vehicle 10 can comprise a first generator 12 and a second generator 14. The first generator 12 can generate DC when the electric vehicle 10 has achieved a certain speed. The second generator 14 can generate DC when the electric vehicle 10 is at a range of speeds lower than those causing activation of the first generator 12. The generated DC is converted into AC by a DC to AC converter 20, sometimes called an inverter, and AC is supplied to a main electric motor 30 various components of the electric vehicle 10, and to a battery 18.

As a further example, a schematic view of an embodiment of an electric vehicle 10 is shown in FIG. 1. A main electric motor 30 is included in the vehicle 10 and is in communication with the right front wheel 32 and the left front wheel 34. The main electric motor 30 can be arranged to drive both of the wheels 32 and 34. The main electric motor 30 may be a DC series wound electric car motor, a permanent magnet DC electric motor, or a 3-phase AC induction motor in accordance with various embodiments. In accordance with various embodiments, the main electric motor 30 may have a variable speed for both forwards and backwards motion of the electric vehicle 10. In some embodiments, a 3-phase AC induction motor may be the electric motor 30 and may be selected so as to achieve a greater range for the electric vehicle 10 and achieve more efficient use of the batteries, for example, lead-acid batteries. Although shown as directly driving both of the front wheels 32 and 34, the main electric motor 30 may drive all of the wheels 32, 34, 36, 38 in some embodiments, or any combination or one of the wheels 32, 34, 36 and 38 in yet further embodiments.

The electric vehicle 10 can comprise a first generator 12 that is in communication with the right rear wheel 36. As an example, the first generator 12 can comprise an armature made of a series of fine wires that are located within a fixed magnetic field. Current and voltage are generated in the armature when it is spun. The first generator 12 can also comprise a commutator, such as a segmented commutator, and brushes or brush assemblies that are used to generate DC that can travel along one or more electrical connections 60 from the first generator 12. In some embodiments, the first generator 12 may be a brushless wound-rotor doubly fed generator or other type of suitable generator.

While shown in communication with rear wheel 36, it is to be understood, however, that the first generator 12 may be in communication with any one or multiple ones of the various wheels 32, 34, 36 and 38 in accordance with other embodiments. In particular, the electric vehicle 10 can further comprise a generator drive system DS for driving the first generator 12. In some embodiments as shown in FIG. 1, the generator drive system DS can engage a rim 40 of a wheel 36 of the electric vehicle 10 and a shaft of the first generator 12 so that the drive system DS drives the first generator 12 as the rim 40 rotates with the wheel 36. For example, the rim 40 of the wheel 36 can be attached to a pulley 42. In some embodiments, the pulley 42 may be rigidly attached to the rim 40. A belt 44 can be looped over the pulley 42 and attached to a drive pulley 46 of the first generator 12.

The DC output from first generator 12 can be sent along one or more electrical connections 60 in the direction shown by arrow $A_1$ to a DC to AC converter 20 that functions to convert the DC output from first generator 12 into AC output. This AC output can be sent along one or more electrical connections 62 in a direction shown by arrow A₂ to the main electric motor 30 to drive the electric motor 30. As used herein, electrical connections can mean any type of connection that can be used to transmit an electric current from one location or component to another location or component in a reasonable manner and can include without limitations, one or more electrical wires, lines, plugs, contacts or the like. The DC to AC converter 20 may be known as an inverter in some embodiments. The AC output sent along one or more electrical connections 62 may be about 60 hertz AC in some embodiments and the conversion by the DC to AC converter 20 may be accomplished by rapid switching using power electronics. It should be understood, though, that the amount of hertz of AC generated can be varied as desired or needed depending on the elements or components used within the electric vehicle.

The electric vehicle 10 can also comprise various systems such as an air conditioner 22, heater 24, and radio 26, for example, that need power in order to function. These components 22, 24 and 26 may receive AC from the DC to AC converter 20 in order to have their energy requirements met. For example, these components 22, 24 and 26 may receive AC from the DC to AC converter 20 along electrical connections. In some embodiments, these components 22, 24 and 26 may receive DC from the one or more batteries 18 (shown in dotted lines in FIG. 1). Alternatively, in some embodiments, the components 22, 24 and 26 can optionally receive AC from the DC to AC converter 20 or DC from the one or more batteries 18. Heaters 24 are generally required on electric vehicles 10 because the main electric motor 30 typically does not generate significant enough heat to be transferred or the heat is not easily transferred to the passenger cabin of the electric vehicle 10 to heat the occupants as occurs in vehicles powered by an internal combustion engine. In accordance with some embodiments, separate components 24 and 22 are not present and a single heating/cooling unit component may be present that provides both warm and cool air for the vehicle 10.

Although three such typical vehicle components 22, 24, and 26 are illustrated, it is to be understood that additional components can be present in accordance with various embodiments of the present subject matter. For example, additional components such as power windows, power seats, automatic convertible top linkages, interior lighting, rear window defrosters, televisions, taillights, headlights, turning lights, and visual lamps such as side marker lamps can be powered by output supplied by the DC to AC converter 20. However, it is to be further understood that in such embodiments that the various components need not necessarily be supplied by output from the DC to AC converter 20 but may instead be supplied by output from the batteries 18 or from other sources. Further, all or some of the mentioned components need not be present in various arrangements of the electric vehicle 10.

The remaining energy converted by the DC to AC converter 20 that is not used to drive the main electric motor 30, air conditioner 22, heater 24, or radio 26 is transferred to the one or more batteries 18 in order to charge the batteries 18. This extra AC output can be sent along one or more electrical connections 64 in a direction shown by arrow A₃ to batteries 18. It is to be understood that the terms "batteries" and "battery" as used herein are interchangeable with one another and carry the same meaning. The batteries 18 can be a bank of batteries that are all constructed in the same manner or may be arranged in one or more different manners from one another. The battery 18 may be an electric vehicle battery or traction battery that is a rechargeable battery. The batteries 18 may be deep cycle batteries. In some embodiments, the batteries 18 may be lead-acid batteries, nickel metal hydride batteries, sodium or "zebra" batteries, and/or lithium ion batteries in accordance with various other embodiments. The batteries 18 can be located at any portion of the electric vehicle 10. For example, the batteries 18 can be located under the floor board in the rear of the electric vehicle 10 in accordance with some embodiments.

The batteries 18 can provide a DC output that can be sent along one or more electrical connections 66 in a direction shown by arrow A₄ to an auxiliary electric motor 16 that causes the auxiliary electric motor 16 to function. The auxiliary electric motor 16 may have different specifications than the main electric motor 30 and may be any electromechanical device that converts electrical energy into mechanical energy. The auxiliary electric motor 16 may be a DC motor in that it runs off of DC supplied by the DC output supplied along the one or more electrical connections 66 from batteries 18. The auxiliary electric motor 16 may be a permanent-magnet electric motor, a brushed DC electric motor, a brushless DC motor, a switched reluctance motor, a stepper DC motor, a careless DC motor, a printed armature motor, or a universal motor. Although described as being a DC motor, the auxiliary electric motor 16 may in fact be an AC motor in accordance with some embodiments of the electric vehicle 10.

The auxiliary electric motor 16 can comprise a drive pulley 52 that is rotated when the auxiliary electric motor 16 is driven. Rotation of the drive pulley 52 causes a belt 50 to be moved that is attached to both the drive pulley 52 and to a driven pulley 48 of a second generator 14. Movement of the belt 50 causes the driven pulley 48 to rotate thus inducing actuation of the second generator 14. The second generator 14 when actuated can convert the mechanical input of the rotation of the drive pulley 48 into electrical energy which can be a DC output that can be sent along one or more electrical connections 68 to the DC to AC converter 20 as shown by arrow A₅.

As an example, in some embodiments, the second generator 14 can comprise an armature made of a series of fine wires that are located within a fixed magnetic field. Current and voltage can be generated in the armature when it is spun upon rotation of the drive pulley 48. The first generator 14 can also comprise a commutator, such as a segmented commutator, and may or may not include brushes or brush assemblies that are used to generate DC that can travel along one or more electrical connections 68 from the first generator 14. Thus, the DC output can then be sent along one or more electrical connections 68 to the DC to AC converter 20 that uses this energy to drive components 22, 24, 26 and main electric motor 30 along with any excess being sent back to the batteries 18 all in the form of AC. In some embodiments, the second generator 14 may be a brushless wound-rotor doubly fed generator or other type of suitable generator.

When a user first starts the electric vehicle 10, the batteries 18 can provide electrical energy in the form of DC output that can be sent along one or more electrical connections 66 to auxiliary electric motor 16 to cause the second generator 14 to actuate to provide electrical energy in the form of DC output that can be sent along one or more electrical connections 68 to the DC to AC converter 20. The DC to AC converter 20 can supply AC output sent along one or more electrical connections 62 to the main electric motor 30 in order to power the main electric motor 30 and drive the front wheels 32 and 34 and hence the electric vehicle 10. The second generator 14 may operate when the electric vehicle 10 moves at a speed below a certain first speed. For example, the first speed may be about 5 mph in some embodiments. In other embodiments, the first speed may be about 10 mph. In other embodiments, the first speed may be from 0-5 mph, from 5-10 mph, or up to 15 mph. The second generator 14 will activate upon startup of the electric vehicle 10 and when the electric vehicle 10 is stopped at stop signs, stop lights, and in traffic and otherwise in an idle condition.

Once the electric vehicle 10 reaches a speed greater than the first speed, the first generator 12 will then activate to supply the electrical energy to operate the electrical vehicle 10 as described above. For example, when the first speed is 5 mph, once the electric vehicle 10 reaches a speed greater than 5 mph, the first generator 12 may actuate so as to produce DC output that can be sent along one or more electrical connections 60. Also, once the first speed is surpassed, the auxiliary electric motor 16 can stop and the second generator 14 will no longer function to provide the DC output sent along one or more electrical connections 68. The batteries 18 may stop providing DC output sent along one or more electrical connections 66 when the speed of the electric vehicle 10 surpasses the first speed. The first and second generators 12 and 14 can be arranged so that they do not produce DC outputs along the electrical connections 60 and 68 simultaneously. In this regard, the electric vehicle 10 can be configured so that only one of the electrical connections 60 or 68 is providing a DC output to the DC to AC converter 20 at any given time.

The first generator 12 may function when the electric vehicle 10 is above the first speed and this DC output sent along the one or more electrical connections 60 can be provided to the DC to AC converter 20 to power the components 22, 24, 26 and main electric motor 30 and to recharge the batteries 18 if there is excess. If the first generator 12 fails for some reason, the electric vehicle 10 can be set up so that the second generator 14 will then function to cause the main electric motor 30 to run. This will be done in the same manner as described above. The first generator 12 or other component may be equipped with a sensor to determine if the first generator 12 is broken or if the electrical connection 60 is not providing a DC output when it should be providing such an output. An emergency switch can actuate to override the controls of the second generator 14 to cause the batteries 18 to provide DC output along the one or more electrical connections 66 to the auxiliary electric motor 16 to cause the second generator 14 to activate to produce the DC output along the one or more electrical connections 68 to drive the main electric motor 30. The second generator 14 may thus operate at all times that the electric vehicle 10 operates even when the speed is below, at or above the first speed if, for example, something is wrong with the first generator 12.

The first generator 12 may be larger than the second generator 14. In this regard, the first generator 12 may be larger because the weight of the electric vehicle 10 may better help generate or generate a larger amount of the electrical energy in the form of the DC output sent along the one or more electrical connections 60 upon actuation of the first generator 12. The first and second generators 12 and 14 may be configured the same as one another or may be configured differently than one another in accordance with certain embodiments. The first generator 12 may be arranged to work at speeds higher than the first speed so that it generates the DC output along the one or more electrical connections 60 more efficiently than a generator working at speeds at or below the first speed. In the same manner, the second generator 14 may be arranged to generate the DC output sent along the one or more electrical connections 68 in an efficient manner at speeds at or below the first speed. As such, the generators 12 and 14 can be configured to better function in view of the speeds their corresponding drive pulleys 46 and 48 will be rotated.

The presence of the second generator 14 and the driving electric motor 16 may allow the batteries 18 to be smaller, conventional batteries 18. It may be the case that in some embodiments, the electric vehicles may use batteries 18 that are large in size, for example, about 900 pounds. However, recharging of the batteries 18 via the generation of the DC output sent along the one or more electrical connections 68 from the second generator 14 may allow the batteries 18 used to be smaller and more conventional in nature. For example, in some embodiments the batteries 18 may be from about 6 to about 9 conventional car batteries that are usually provided to start up a conventional internal combustion engine vehicle. The batteries 18 may be constantly charged by the outputs sent along the electrical connections 60 and/or 68 one of which is always supplying an output from the respective first generator 12 or the second generator 14.

The electric vehicle 10 may run on energy from the batteries 18 and from energy generated through rotation of one or more of the wheels 32, 34, 36 and/or 38. Such a design may eliminate the omission of carbon monoxide and pollutants that may otherwise be generated through the operation of an internal combustion engine. The electric vehicle 10 may lack an internal combustion engine in certain embodiments. In yet other arrangements, the electric vehicle 10 may be a hybrid vehicle in that an internal combustion engine is present in the electric vehicle 10 and can operate at certain times or at certain speeds to provide locomotive driving of the electric vehicle 10. In some embodiments, a plug or receptacle may be provided in or on the electric vehicle 10 that is electrically connected to the one or more batteries to provide external charging of the batteries, for example, at charging stations located at the user's home or place of work or at other locations such as service stations.

Figure 2:
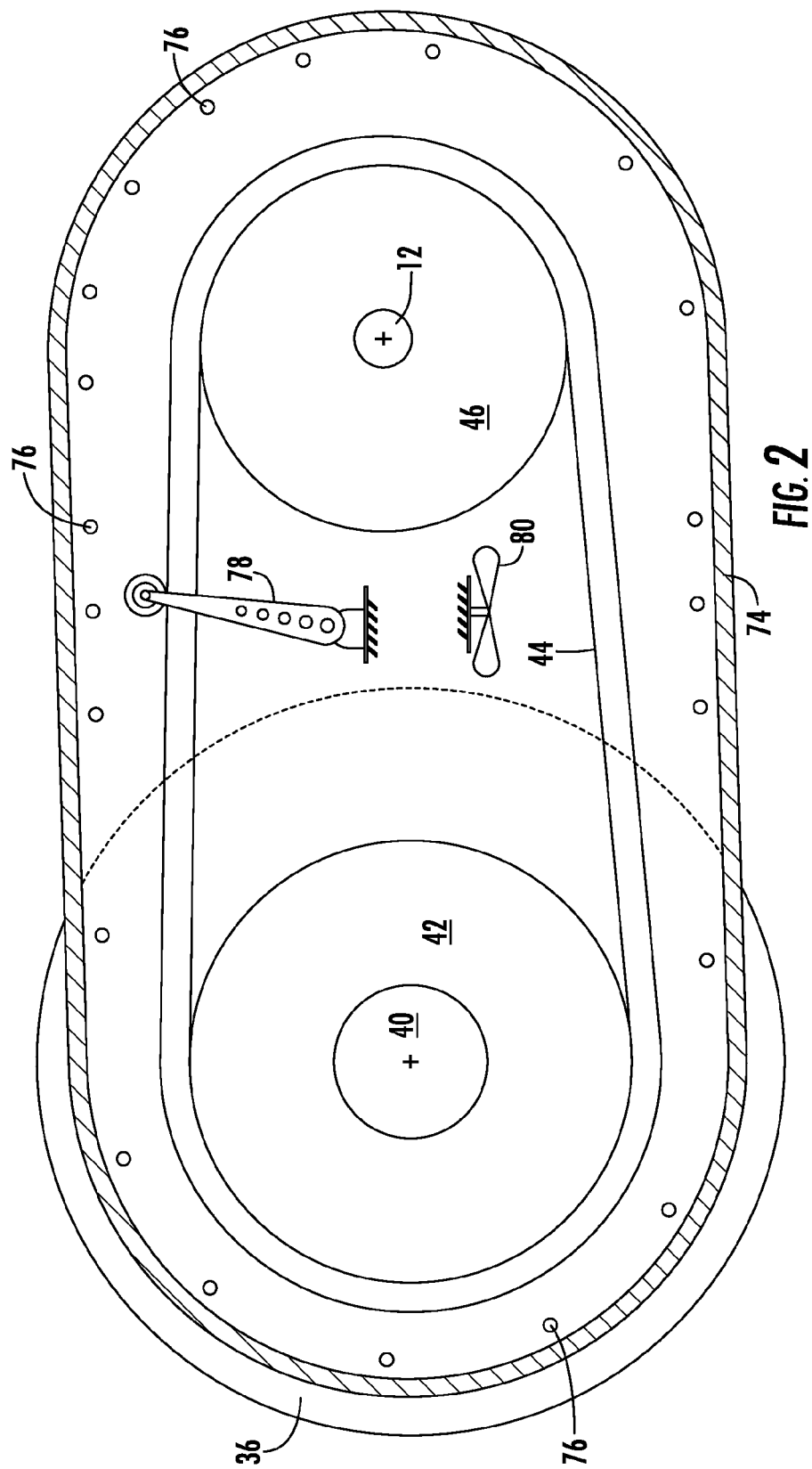
FIG. 2 is a side view partially in cross-section of an embodiment of a generator drive system that comprises a rim, pulley, and drive pulley arrangement that can be used in an electric vehicle in accordance with the present subject matter.

The first generator 12 can be configured in a variety of manners in order to be capable of receiving mechanical energy from the rotation of one or more of the wheels 32, 34, 36 and/or 38. With reference now to FIG. 2, a partially cross-sectional view of a portion of a generator drive system of the electric vehicle 10 is shown in which the pulley 42 is rigidly attached to a rim 40 of the right rear wheel 36. This attachment can be effected in a variety of manners. The belt 44 can be looped around the pulley 42 and engages the pulley 42 and the rearwardly disposed drive pulley 46 of the first generator 12. A belt tensioner or a torque arm 78 can be included and may be rigidly mounted onto the frame of the electric vehicle 10. The belt tensioner 78 is urged against the belt 44 and this engagement can be via a roller of the belt tensioner 78 or other surface that allows the belt 44 to easily move therethrough. The belt tensioner 78 can act and engage the outside surface of the belt 44 or may be inwardly placed so that it pushes onto the belt 44 from the inside of the belt 44, i.e., from the opposite direction shown in FIG. 2.

The pulley 42, belt 44, drive pulley 46 and belt tensioner 78 may be located inside of a cover 74 that is present to protect these components from road debris and wetness. The cover 74 may include a plurality of ventilation ports 76 located at the side of the cover 74. In some embodiments as shown, ventilation ports 76 may be located at the top and/or bottom as well as or alternatively to those located in the side of the cover 74. One or more cooling fans 80 can be located within the cover 74 in order to cool the various components located inside of the cover 74. The cooling fans 80 may be mounted onto the frame of the electric vehicle 10 in a similar manner as the belt tensioner 78. In other embodiments, the belt tensioner 78 and cooling fan 80 may be mounted to the cover 74. The cooling fans 80 may be run via AC power supplied by the DC to AC converter 20 in the manners previously discussed. Alternatively, the cooling fans 80 may be run via DC power supplied by the one or more batteries 18. The belt 44 may be made of a semi-flexible material, such as rubber, in some embodiments. The belt 44 may be made out of the same material commonly found in serpentine belts in conventional automobiles. In other arrangements, the belt 44 may be a metal chain that is composed of a plurality of links attached to one another to cause the belt 44 to have a degree of flexibility.

Figure 3:
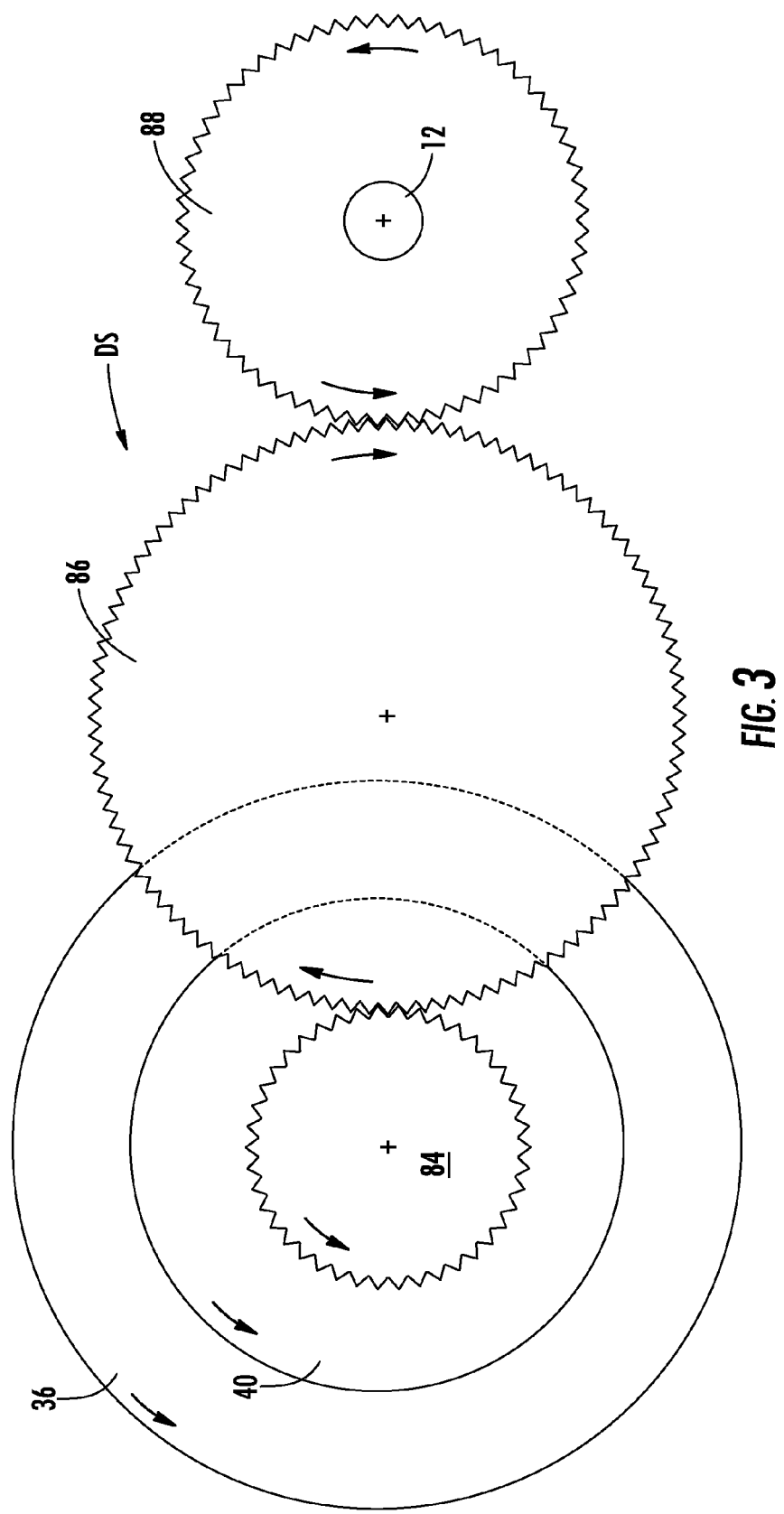
FIG. 3 is a side view of an embodiment of a sprocket, transmission gear, and drive gear arrangement that can be used in an electric vehicle in accordance with the present subject matter.

Another generator drive system DS of transmitting mechanical motion to the first generator 12 is shown in FIG. 3 in which a sprocket 84 can be rigidly attached to a rim 40 of the right rear wheel 36. Rotation of the wheel 36 causes rotation of the rim 40 which in turn causes rotation of the rigidly attached sprocket 84. A transmission gear 86 is in communication with the sprocket 84 via meshing of the teeth of the transmission gear 86 and the sprocket 84. Rotation of the sprocket 84, for example in the counter clockwise direction, causes the teeth to move which in turn causes the teeth and hence the transmission gear 86 to likewise rotate. The transmission gear 86 will rotate in the clockwise direction. The transmission gear 86 is in communication with a drive gear 88 of the first generator 12. The teeth of the transmission gear 86 mesh with the teeth of the drive gear 88 and rotation of the transmission gear 86 in the clockwise direction causes the drive gear 88 to rotate in the counter clockwise direction. In accordance with other embodiments, the transmission gear 86 may not present. Instead, a chain can connect the drive gear 88 to the sprocket 84 and rotation of the sprocket 84 causes the chain to move, which in turn causes the attached drive gear 88 to rotate.

The drive gear 88 can be rigidly attached to or can be in effect, a portion of the first generator 12 such that rotation of the drive gear 88 causes the first generator 12 to actuate in order to produce electrical energy in the form of the DC output that can be sent along one or more electrical connections 60. The drive train may be arranged differently in accordance with other embodiments and it is to be understood that various arrangements may be used to cause the sprocket 84 to transmit motion that is either rotational, linear, or a combination of the two in nature to the first generator 12 in order to actuate and drive the first generator 12.

Figure 4:
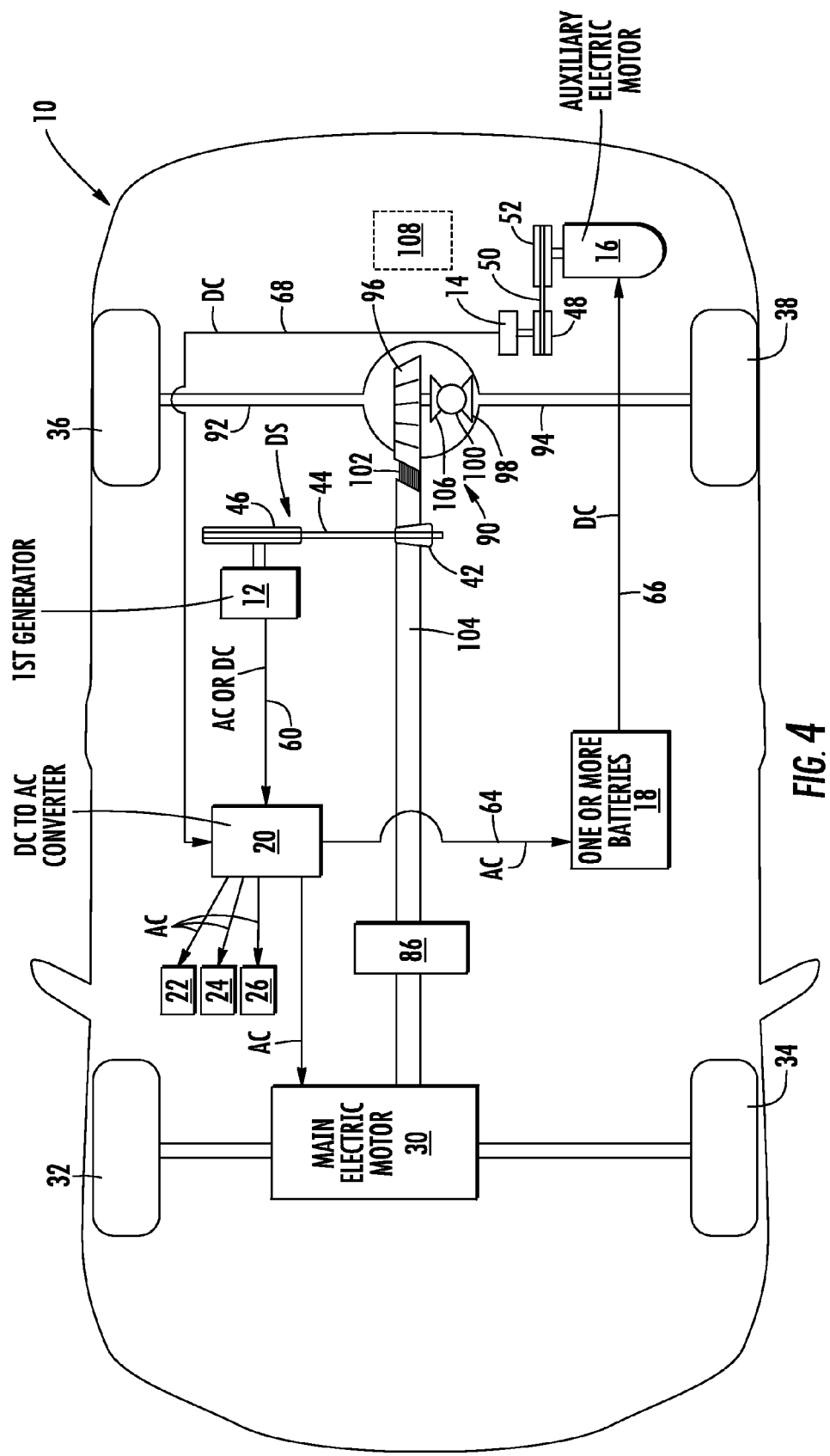
FIG. 4 is a schematic view of another embodiment of an electric vehicle that comprises an embodiment of a differential gear system and first generator in accordance with the present subject matter.

Another embodiment of the electric vehicle 10 in shown in FIG. 4 in which an alternative means of providing mechanical power to drive the first generator 12 is shown. The electric vehicle 10 can be a rear wheel 36, 38 drive vehicle in FIG. 4 as the main electric motor 30 drives the rear wheels 36, 38 and the front wheels 32, 34 are not driven by the main electric motor 30. A differential gear system 90 is included in the electric vehicle 10 in order to transmit rotation to can be 36 and 38 to in turn cause the first generator 12 to produce output sent along one or more electrical connections 60. The differential gear system 90 may include a half shaft 92 that can be rigidly attached to the right rear wheel 36, and a half shaft 94 that is rigidly attached to the left rear wheel 38. Rotation of the half shafts 92 and 94 cause the rear wheels 36 and 38 to likewise rotate. The half shaft 94 has a sun gear 98 located on its terminal end. The half shaft 92 has a crown wheel 96 located along its length and a sun gear 106 located at its terminal end. A planet gear 100 engages and is in communication with both of the sun gears 98 and 106 and rotates when the two sun gears 98 and 106 rotate. Another planet gear, not shown in FIG. 4, is located below the illustrated planet gear 100. The differential gear system 90 allows the electric vehicle 10 to better handle turns as the wheels 36 and 38 may rotate at different amounts or speeds due to the fact that one is on an inside turning radius and the other is on an outside turning radius and thus turns at a different speed.

Rotation of the crown wheel 96 causes rotation of the rigidly attached sun gear 106. The crown wheel 96 and the engaged driving pinion 102 have teeth that are helical so that up and down motion in rough driving conditions can be handled. Rotation of the crown wheel 96 causes rotation of the rigidly attached half shaft 92. Rotation of the sun gear 106 is transmitted via the planet pinion 100, and the other planet pinion below 100 that is not visible, to the engaged sun gear 98. Rotation of the sun gear 98 causes the rigidly attached half shaft 94 to rotate which in turn causes the rigidly attached left rear wheel 38 to rotate.

Rotation of the driving pinion 102 causes the engaged crown wheel 96 to rotate. The driving pinion 102 is on the end of a transmission shaft 104 which when rotated causes the driving pinion 102 to likewise rotate. The main electric motor 30 drive the transmission shaft 104 and causes it to rotate. A transmission gear 86 may be present to communicate rotation of the main electric motor 30 to the transmission gear 86. In other arrangements, the transmission gear 86 need not be present. The transmission shaft 104 can be coupled to the first generator 12 and cause the first generator 12 to actuate to produce the DC output sent along one or more electrical connections 60. For example, the electric vehicle 10 can further comprise a generator drive system DS that can engage the transmission shaft 104 and the first generator 12 so that the drive system DS drives the first generator 12 as the transmission shaft 104 rotates. Here, a pulley 42 may be rigidly attached to the transmission shaft 104 and rotation of the transmission shaft 104 causes the pulley 42 to rotate. A belt 44 may be attached to both the pulley 42 and the pulley 46 of the first generator 12 so that rotation of the transmission shaft 104 is communicated to the first generator 12. The other components in the arrangement of FIG. 4 are similar to those previously discussed and a repeat of this information is not necessary.

In other arrangements, the transmission shaft 104 could be in communication with either the auxiliary electric motor 16 and/or the other axle of the electric vehicle 10. Although shown as a belt and pulley connection 42, 44 and 46, a sprocket, clutch or other component can be used and driven by the transmission shaft 104 so that in turn the first generator 12 is driven. In yet other arrangements, the first generator 12 is not driven by the transmission shaft 104 but is instead driven by a pulley, sprocket, clutch or other mechanism that is attached to one of the half shafts 92 and/or 94, and/or to the crown wheel 96.

The electric vehicle 10 can be set up so that both wheels 36 and 38 rotate to function to provide mechanical movement energy to the first generator 12. In other embodiments, the wheels that drive the first generator 12 may be the front wheels 32 and 34. In yet further arrangement, all of the wheels 32, 34, 36 and 38 can be arranged to drive the first generator 12. The use of more than one of the wheels 32, 34, 36 or 38 to drive the first generator 12 may be employed when a larger first generator 12 is needed in order to generate a larger magnitude of output that can be sent along one or more electrical connections 60.

The previous embodiments describe the first generator 12 as being driven by one of the rear wheels 36 and/or 38 instead of by the front wheels 32 and/or 34. In other embodiments, the front axle can be used to drive the first generator 12 and the variously described and illustrated means of driving the first generator 12 can be substituted so that the front wheels 32 and/or 34 are shown and described instead. A repeat of this information showing the front wheels 32 and/or 34 driving the first generator 12 in the various schemes, or the front axle instead of the rear axle 92, 94 driving the first generator 12 is thus not necessary as this has been previously shown and described regarding the rear wheels 32, 34 and rear axle 92, 94 and thus substitution can be employed for these components.

Figure 5:
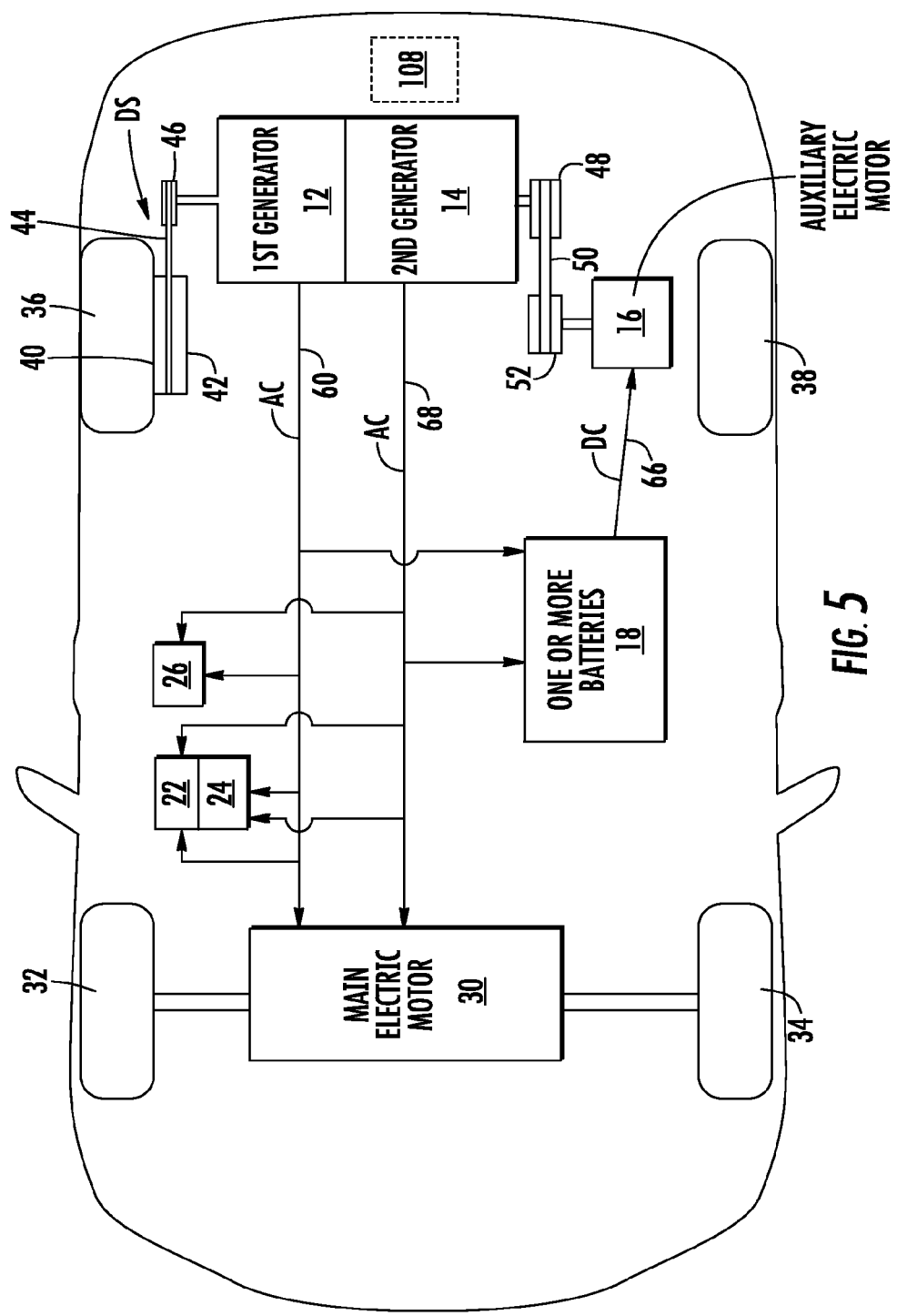
FIG. 5 is a schematic view of further embodiment of an electric vehicle in accordance with the present subject matter.

FIG. 5 illustrates another embodiment in which the first and second generators 12 and 14 output AC instead of DC. In this regard, the generators 12 and 14 may directly output AC instead of DC or converters may be present to convert this current. The auxiliary electric motor 16 can be used to drive the drive pulley 48 and this mechanical motion may be used by the second generator 14 to cause the second generator 14 to cause the output sent along one or more electrical connections 68 that is AC. The second generator 14 may be arranged as previously discussed in that it operates when the speed of the electric vehicle 10 is at or below a first speed, for example, about 5 mph. The output sent along one or more electrical connections 68 is fed into the components 22, 24 and 26 and the main electric motor 30 that all operate on AC and thus are all driven via the direct output sent along one or more electrical connections 68 of the second generator 14. Also, the output sent along one or more electrical connections 68 is fed into the batteries 18 in order to charge the batteries 18.

When the speed of the electric vehicle 10 moves over the first speed, for example, when the speed of the electric vehicle 10 is greater than about 5 mph, the second generator 14 stops producing the output sent along one or more electrical connections 68 and the first generator 12 produces the output sent along one or more electrical connections 60 through conversion of mechanical input energy from the rotating drive pulley 46. In particular, a generator drive system DS can be provide that can comprise a pulley 42 attached to a rim 40 of a wheel 36 of the electric vehicle, a pulley 46 attached to a shaft of the first generator 12, and a belt 44 that rotatably engages the pulley 42 attached to the rim 40 of the wheel 36 and the pulley 46 attached to a shaft of the first generator 12 to drive the first generator 12. The output sent along one or more electrical connections 60 is AC and thus the first generator 12 functions to convert mechanical rotational input energy into AC output sent along one or more electrical connections 60. The output sent along one or more electrical connections 60 can be used to drive the components 22, 24 and 26 and main electric motor 30 that can all be driven via input AC. Additionally or alternatively, as described above, the components 22, 24 and 26 can be configured to receive DC from the one or more batteries 18 as described above. The output sent along one or more electrical connections 60 is also used to reenergize the batteries 18. This arrangement negates the need to have a DC to AC converter 20 because the output energy that travels along the electrical connections 60 and 68 is already AC. The various paths of energy of the output sent along the electrical connections 60 and 68 may be in parallel or series or a combination of parallel and series to the various components 30, 18, 22, 24 and 26 in all of the disclosed embodiments herein.

The functioning of the first and second generators 12 and 14 of the electric vehicle 10 can be accomplished in a variety of manners. For example, with reference to FIG. 1, a controller, such as a microprocessor 108, may be present and can obtain speed data from the electric vehicle 10 so that the microprocessor 108 knows the speed of the electric vehicle 10. If the speed is less than or equal to a first speed, the microprocessor 108 can cause or allow the auxiliary electric motor 16 to function. In this regard, the microprocessor 108 can be in communication with the auxiliary electric motor 16 and may be capable of opening or closing a switch of the auxiliary electric motor 16. The opening or closing of this switch may cause the auxiliary electric motor 16 to be turned on when the speed is less than or equal to the first speed so that the electric motor 16 turns the drive pulley 48 and the second generator 14 generates the output sent along one or more electrical connections 68. The microprocessor 108 may turn off the auxiliary electric motor 16 so that it does not function and in turn the second generator 14 does not function and the output sent, along one or more electrical connections 68 is not generated.

The microprocessor 108 may be in communication with the first generator 12 such that the microprocessor 108 can actuate a switch of the first generator 12 to turn the first generator 12 on or off. If the speed of the electric vehicle 10 is greater than a first speed, the microprocessor 108 can cause the first generator 12 to be turned on so that the output sent along one or more electrical connections 60 is generated. If the speed is less than or equal to the first speed, the microprocessor 108 can cause the first generator 12 to be switched off and thus the first generator 12 does not function and the output sent, along one or more electrical connections 60 is not generated. With such a control scheme, the microprocessor 108 can control switching of the first and second generators 12 and 14 so that one is on when desired and the other is off when desired. Other controllers can be employed instead or in addition to microprocessor 108. For example, the controller can comprise other computers, computer systems, minicomputers, or microprocessors that are used within the electric vehicle 10 can be used. FIGS. 4 and 5 illustrate in dotted lines the possible presence of a controller 108. The controllers 108 can be in wired or wireless communications with the first generator, the second generator, the auxiliary motor, the main motor, and/or the DC to AC converter as needed or desired to help manage the use of such elements and the use and distribution of power generated.

Figure 6:
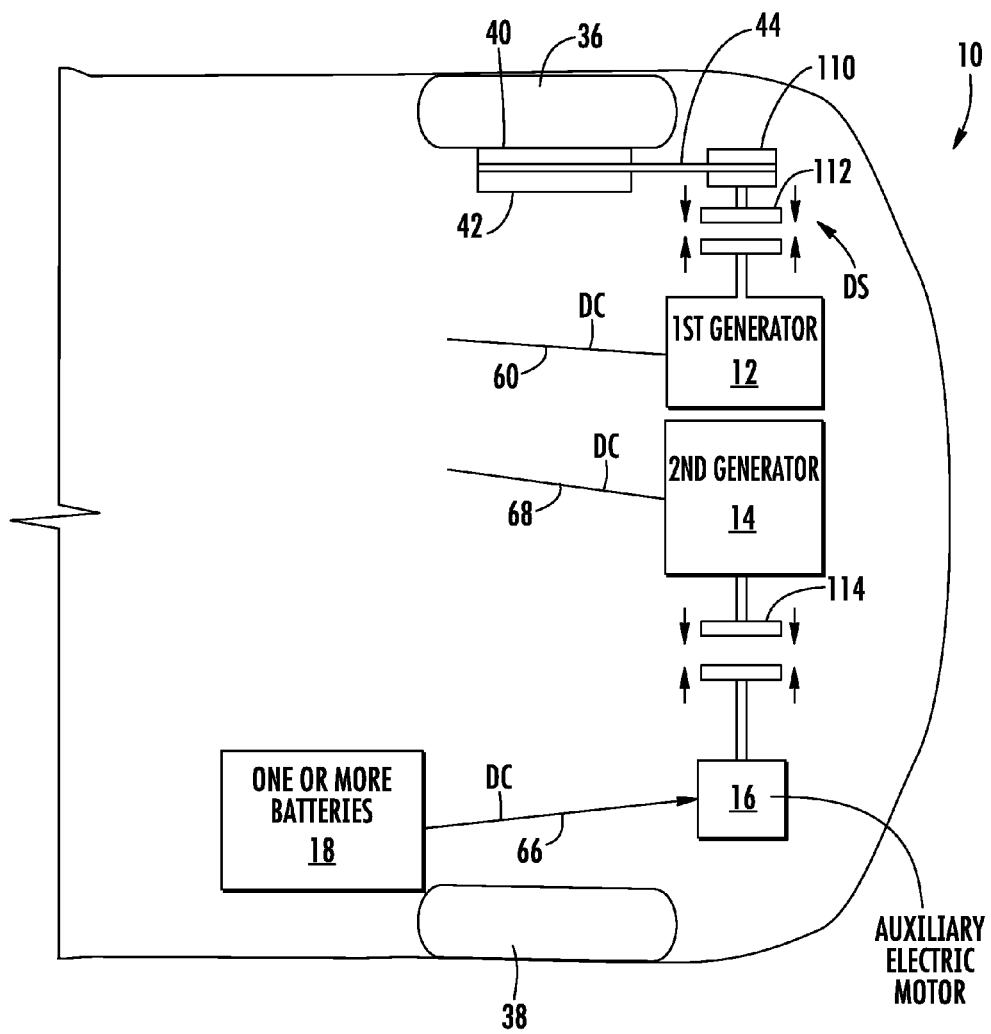
FIG. 6 is a partial schematic view of an embodiment of an electric vehicle that comprises a pair of clutches in accordance with the present subject matter.

Another arrangement of the electric vehicle 10 is shown in FIG. 6 in which clutches 112 and 114 are used to control generation of the outputs sent along the electrical connections 60 and 68. Other various portions of the electric vehicle 10 can be the same as those previously described and a repeat of this information is not necessary. With respect to the first generator 12, a generator drive system DS can employ the belt 44 that can be turned in a manner as previously discussed and can be looped around a pulley 110 which is turned as the belt 44 is turned. A clutch 112 can be disposed between the pulley 110 and the first generator 12. The clutch 112 can be used to both transfer the rotation of the pulley 110 to the first generator 12 to cause the first generator 12 to produce the output sent along one or more electrical connections 60, and can be used to prevent transfer of the rotation of the pulley 110 so that the first generator 12 does not actuate so that the output sent along one or more electrical connections 60 is not produced. The clutch 112 can be controlled by a microprocessor or other signal sent from other components of the electric vehicle 10 so that the output is produced when desired.

Another clutch 114 can be located between the auxiliary electric motor 16 and the second generator 14. The clutch 114 can allow transfer of mechanical rotation of the output of the auxiliary electric motor 16 to be transferred to the second generator 14 so that the second generator 14 produces the output sent along one or more electrical connections 68. The clutch 114 can also be configured so that it prevents rotational movement of the auxiliary electric motor 16 output from being transferred to the second generator 14 so that the second generator 14 does not produce the output sent along one or more electrical connections 68. The second clutch 114 can be actuated as desired so that the output sent along one or more electrical connections 68 is in turn generated as desired.

Although described as having an output sent along either electrical connections 60 or 68, other arrangements are possible in which at some points in time both of the outputs sent along the electrical connections 60 and 68 are present. For example, if the speed is at or below the first speed, both of the outputs sent along the electrical connections 60 and 68 can be generated. If the speed is above the first speed, the output sent along the electrical connections 60 can be generated but the output sent along the electrical connections 68 may not be generated. The electric vehicle 10 can be constructed so that the batteries 18 can be continually charged while the electric vehicle 10 is running, i.e., operating, such that when either the first or second generators 12 and 14 are producing outputs sent along either electrical connections 60 or 68, the batteries 18 are being charged by virtue of one of these outputs sent along the electrical connections 60 or 68.

Figure 7:
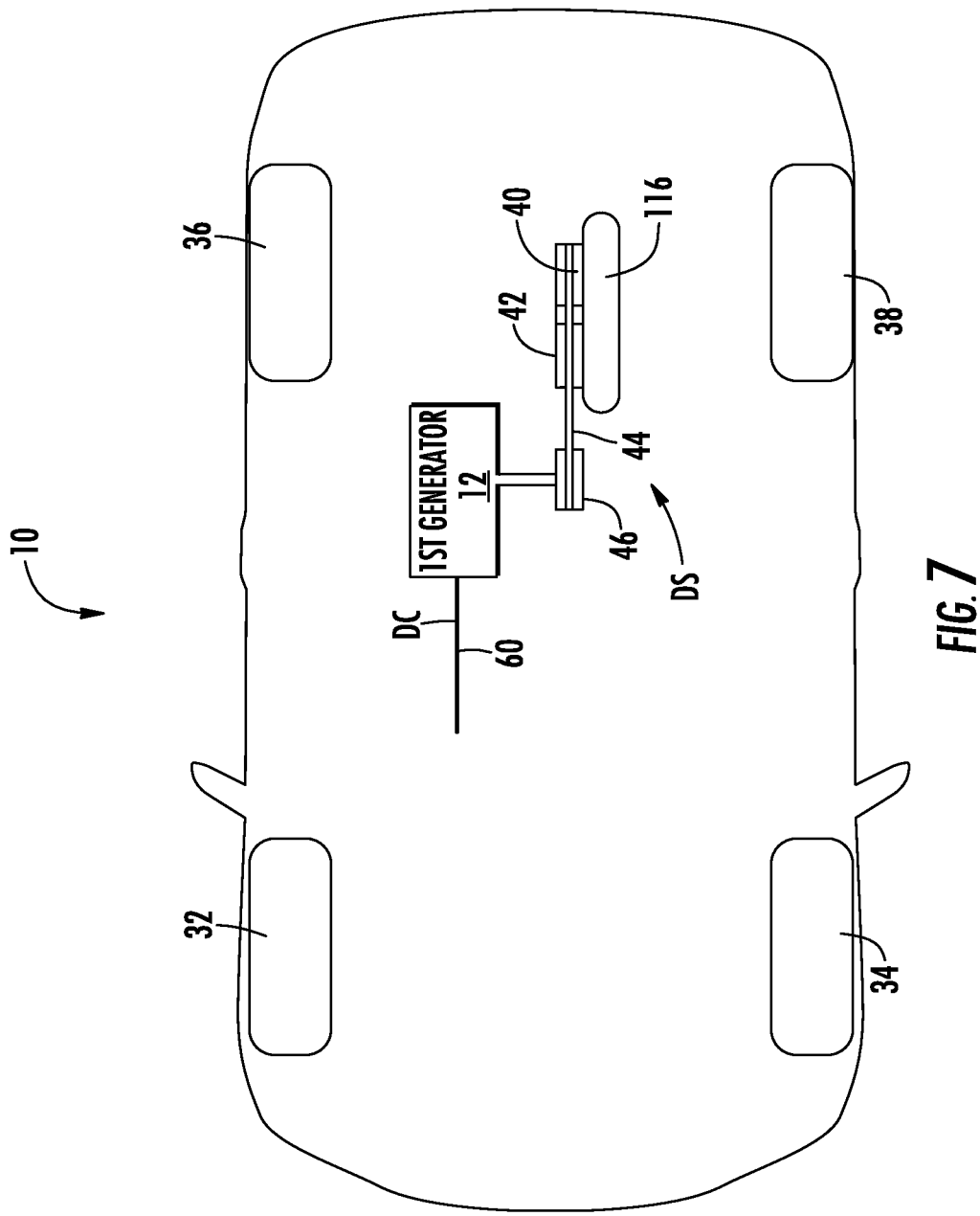
FIG. 7 is a partial schematic view of an embodiment of an electric vehicle that comprises a fifth wheel in accordance with the present subject matter.

FIG. 7 shows another arrangement of the electric vehicle 10. A fifth wheel 116 is included and may be a low rider wheel in some arrangements. Here, the fifth wheel 116 may be configured differently in that it may be a different size and have a different configuration from that of the other wheels 32, 34, 36 and 38 of the electric vehicle 10. Rotation of the fifth wheel 116 can cause a generator drive system DS to drive the first generator 12. In particular, rotation of the fifth wheel 116 causes a rim 40 of the fifth wheel 116 to rotate to in turn cause a pulley 42 rigidly attached to the rim 40 to rotate. A belt 44 can be looped around pulley 42 and will move when the pulley 42 rotates. The belt 44 will cause the drive pulley 46 to rotate and will in turn cause mechanical rotation to be induced onto the first generator 12 so that the first generator 12 will function to produce the output sent along one or more electrical connections 60. The other portions of the electric vehicle 10 may be as that previously described and a repeat of this information and illustration in the drawing of FIG. 7 is not necessary.

Figure 8:
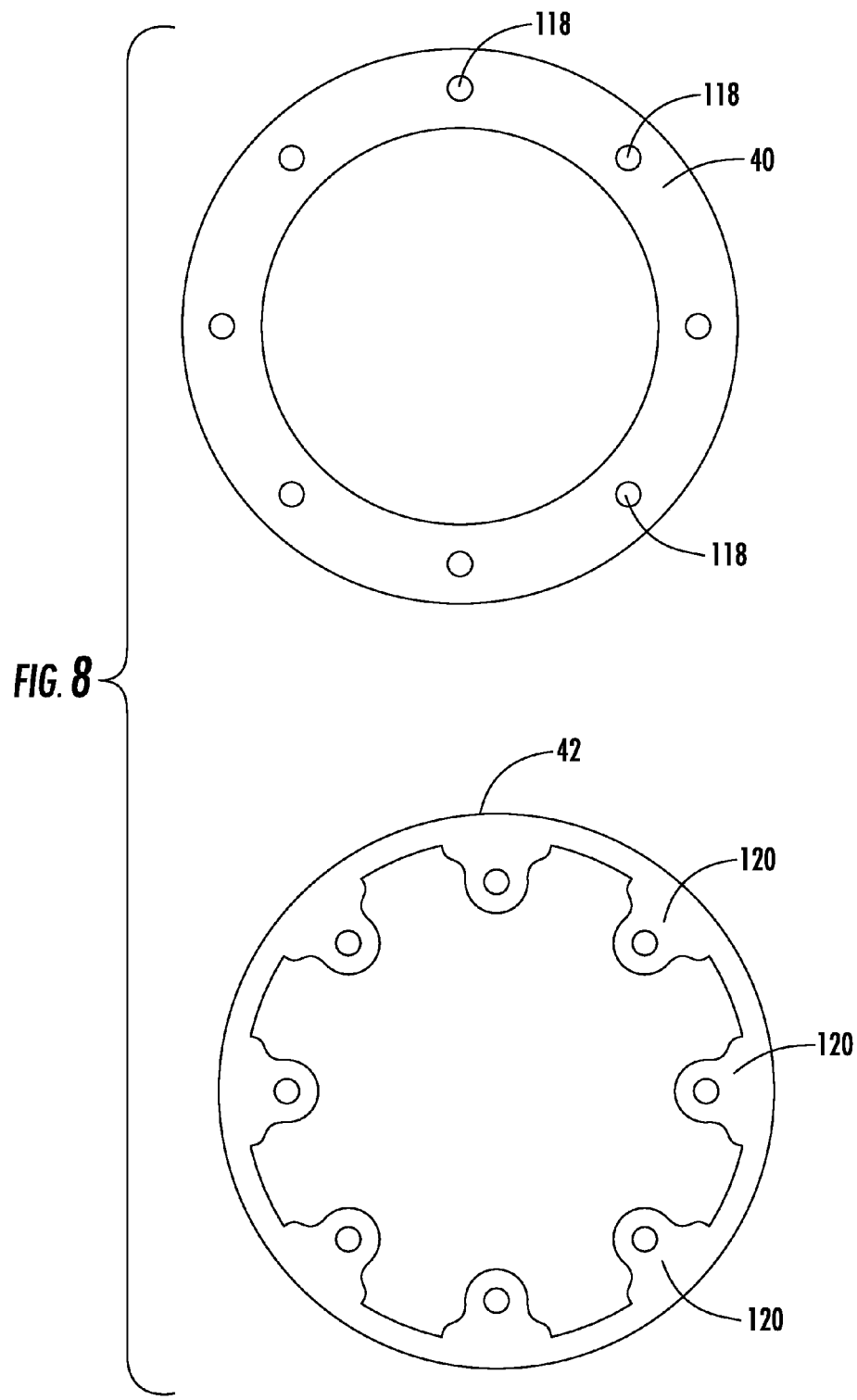
FIG. 8 is a schematic side view of a rim and pulley arrangement that can be used in an electric vehicle in accordance with the present subject matter.

FIG. 8 is a side view of an alternative arrangement of the rim 40 in which a series of bolts 118 rigidly engage the rim 40 and are disposed through the rim 40 towards the interior of the electric vehicle 10. The pulley 42 has a series of mounting brackets 120 disposed about its circumference that align with the bolts 118 and have holes that receive the bolts 118 so that the pulley 42 can be mounted onto the rim 40. Nuts may be used to effect attachment of the bolts 118 to the mounting brackets 120. The belt 44 can be looped around the outer circumference of the pulley 42 as previously discussed. The belt 44 need not contact the rim 40 in this arrangement.

Figure 9:
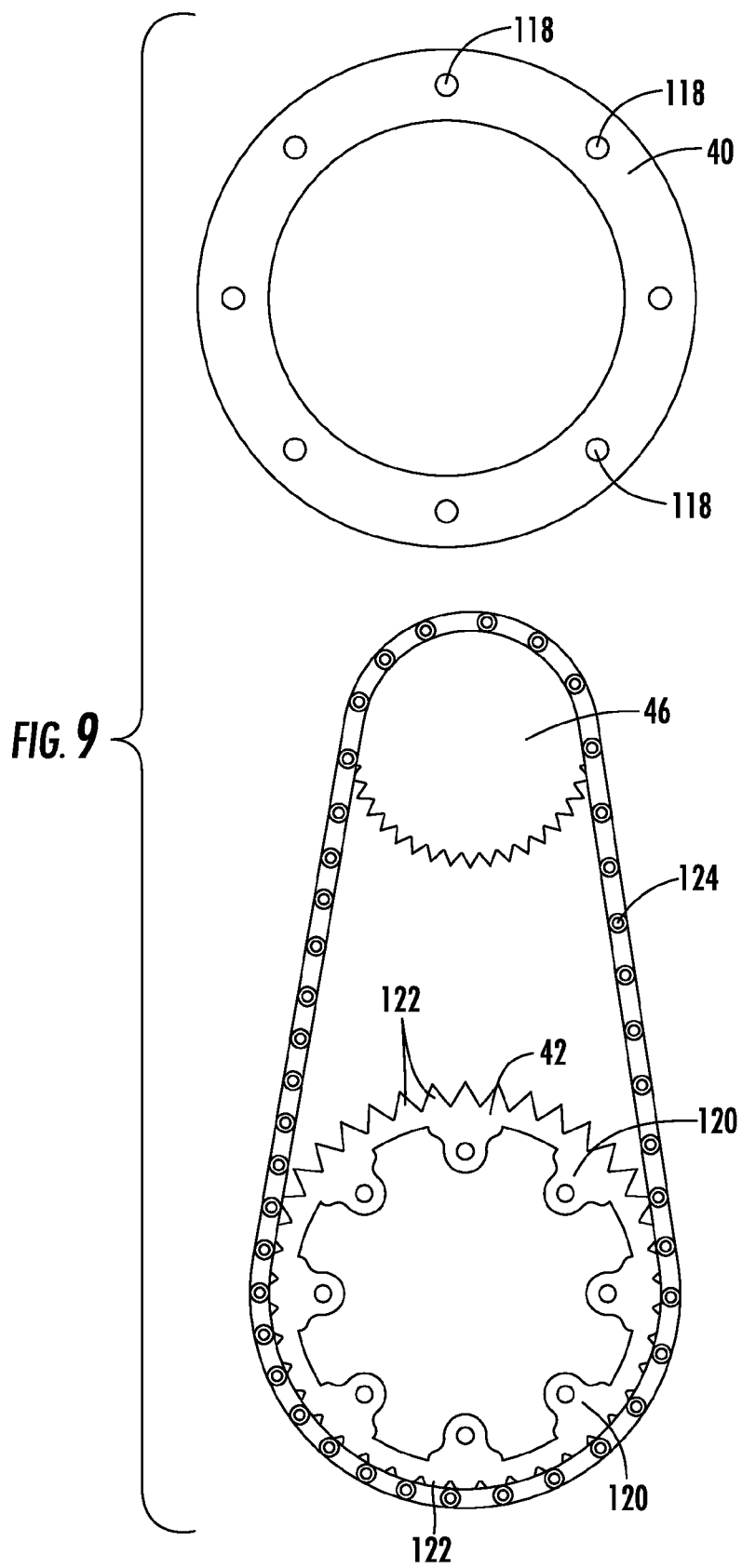
FIG. 9 is a schematic side view of a rim and pulley/sprocket arrangement that can be used in an electric vehicle in accordance with the present subject matter.

FIG. 9 is a side view of another drive system arrangement in which the rim 40 is again provided with bolts 118. The pulley 42 has a series of mounting brackets 120 that can be attached to the bolts 118 to cause the pulley 42 to be attached to the rim 40. The pulley 42 has a series of teeth 122 around its outer circumference. The pulley 42 may be more appropriately described as a sprocket in this arrangement. A chain 124 can be looped around the outer circumference of the pulley/sprocket 42 and can engage the teeth 122. The chain 124 can function in the same way as the belt 44 previously described so that the motion of the rim 40 can be transferred to the first generator 12. The chain need not contact the rim 40 in this arrangement. The chain 124 may engage teeth of the pulley 46 or sprocket 46 that is rigidly attached to the first generator 12 so that the motion of the chain 124 is transferred to the sprocket 46 and causes the sprocket 46 to rotate to actuate the first generator 12.

Although described as being generators 12 and 14, it is to be understood that other embodiments exist in which alternators instead of generators 12 and 14 are used. For example, elements 12 and/or 14 in the previous figures and description could be alternators instead of generators. The outputs 60 and 68 may still be produced to drive the electric motor 16 and other portions of the electric vehicle.

Further, it is to be understood that the schematic figures are used to convey the present subject matter and should not be used to limit the relative placement of the different elements, such as the generators, motors, batteries, etc. For instance, the main motor, auxiliary motor one or more of the generators, and/or the DC to AC converter can be placed at other feasible locations within the vehicle other than those depicted in the schematic figures. For example, in a converted car designed for an internal combustion engine, multiple of these elements may be placed in close proximity to each other under the hood of the converted car. Other configurations are contemplated and are encompassed by the present subject matter.

While the present subject matter has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims. The present subject matter can be embodied in other forms without departure from the spirit and essential characteristics thereof. The embodiments described therefore are to be considered in all respects as illustrative and not restrictive. Although the present subject matter has been described in terms of certain embodiments, other embodiments that are apparent to those of ordinary skill in the art are also within the scope of the present subject matter.

What is claimed:

1. An electric vehicle, comprising:
   a first generator configured to generate electric power when the electric vehicle is moving at or above a first speed;
   a second generator configured to generate electric power when the electric vehicle is at least one of moving below the first speed or standing at a stop;
   a main electric motor that is configured to receive electric power from the first generator when the electric vehicle is moving at or above the first speed and from the second generator when the electric vehicle is moving below the first speed
   an auxiliary electric motor in communication with the second generator, wherein activation of the auxiliary electric motor causes the second generator to generate electric power; and
   one or more batteries configured to supply electric power to the auxiliary electric motor.

2. The electric vehicle according to claim 1, wherein the first generator and the second generator generate a direct current (DC) and the electric vehicle further comprises a DC to AC converter that is electrically connected to the first generator and the second generator to convert DC supplied by the first generator or the second generator to alternating current (AC), the DC to AC converter supplying AC to the main electric motor and the batteries.

3. The electric vehicle according to claim 2, wherein the DC to AC converter additionally supplies AC to components of the electric vehicle in addition to the main electric motor and the batteries.

4. The electric vehicle according to claim 1, further comprising a controller that obtains speed data from the electric vehicle and activates the auxiliary motor to cause the second generator to generate electric power when the electric vehicle is moving below the first speed and activates the first generator when the electric vehicle is moving at or above the first speed.

5. The electric vehicle according to claim 4, wherein the controller deactivates the auxiliary motor when the electric vehicle is moving at or above the first speed and deactivates the first generator when the electric vehicle is moving below the first speed.

6. The electric vehicle according to claim 1, further comprising a generator drive system that engages a rim of a wheel of the electric vehicle and the first generator so that the drive system drives the first generator as the rim rotates with the wheel.

7. The electric vehicle according to claim 6, wherein the generator drive system comprises a pulley attached to a rim of a wheel of the electric vehicle, a pulley attached to a shaft of the first generator, and a belt that rotatably engages the pulley attached to the rim of the wheel and the pulley attached to a shaft of the first generator to drive the first generator.

8. The electric vehicle according to claim 6, wherein the generator drive system comprises a sprocket attached to a rim of a wheel of the electric vehicle that is used to drive the first generator.

9. The electric vehicle according to claim 8, wherein the generator drive system comprises a transmission gear attached to a shaft of the first generator and a chain that rotatably engages the sprocket attached to a rim of a wheel of the electric vehicle and the transmission gear attached to a shaft of the first generator to drive the first generator.

10. The electric vehicle according to claim 6, further comprising a cover for the drive system to protect the drive system.

11. The electric vehicle according to claim 6, further comprising a clutch disposed between the generator drive system and the first generator and a clutch disposed between the auxiliary motor and the second generator, the clutches used respectively to both transfer and stop the rotation of the first generator and the second generator.

12. The electric vehicle according to claim 1, further comprising a generator drive system that engages a transmission shaft of the electric vehicle and the first generator so that the drive system drives the first generator as the transmission shaft rotates.

13. The electric vehicle according to claim 1, wherein the first generator and the second generator generate AC that is supplied directly to the main motor.

14. An electric vehicle, comprising:
a first generator configured to generate direct current (DC) when the electric vehicle is moving at or above a first speed;
a second generator configured to generate DC when the electric vehicle is at least one of moving below the first speed or standing at a stop;
an auxiliary electric motor in communication with the second generator, wherein activation of the electric motor causes the second generator to generate DC;
batteries configured to supply DC to the auxiliary electric motor;
a DC to AC converter configured to supply alternating current (AC) to the batteries and to a component of the electric vehicle; and
a main electric motor configured to receive AC from the DC to AC converter.

15. The electric vehicle according to claim 14, further comprising a microprocessor that obtains speed data from the electric vehicle and activates the auxiliary motor to cause the second generator to generate electric power when the electric vehicle is moving below the first speed and activates the first generator when the electric vehicle is moving at or above the first speed, the microprocessor deactivating the auxiliary motor when the electric vehicle is moving at or above the first speed and deactivating the first generator when the electric vehicle is moving below the first speed.

16. The electric vehicle according to claim 14, further comprising a generator drive system that comprises a drive pulley, a pulley attached to a shaft of the first generator and a belt that rotatably engages the drive pulley and the pulley attached to a shaft of the first generator to drive the first generator.

17. The electric vehicle according to claim 14, further comprising a generator drive system that comprises a sprocket attached to a rim of a wheel of the electric vehicle that is used to drive the first generator, a transmission gear attached to a shaft of the first generator, and a chain that rotatably engages the sprocket attached to a rim of a wheel of the electric vehicle and the transmission gear attached to a shaft of the first generator to drive the first generator.

18. The electric vehicle according to claim 14, further comprising a cover for the drive system to protect the drive system.

19. The electric vehicle according to claim 14, further comprising a generator drive system that engages a transmission shaft of the electric vehicle and the first generator so that the drive system drives the first generator as the transmission shaft rotates.

20. An electric vehicle, comprising:
a first generator configured to generate AC when the electric vehicle is moving at or above a first speed;
a second generator configured to generate AC when the electric vehicle is at least one of moving below the first speed or standing at a stop;
a main electric motor configured to receive AC from the first generator when the electric vehicle is moving at or above the first speed and from the second generator when the electric vehicle is moving below the first speed;
an auxiliary electric motor in communication with the second generator, wherein activation of the auxiliary electric motor causes the second generator to generate AC; and
one or more batteries configured to supply DC to the auxiliary electric motor to power the auxiliary motor.

* * * * *